(12) United States Patent
Faler

(10) Patent No.: US 10,934,388 B2
(45) Date of Patent: Mar. 2, 2021

(54) CIS-POLYCYCLOOLEFINS AND METHODS FOR FORMING CIS-POLYCYCLOOLEFINS

(71) Applicant: ExxonMobil Chemical Patents Inc., Baytown, TX (US)

(72) Inventor: Catherine A. Faler, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 48 days.

(21) Appl. No.: 16/005,154

(22) Filed: Jun. 11, 2018

(65) Prior Publication Data
US 2019/0040186 A1    Feb. 7, 2019

Related U.S. Application Data

(60) Provisional application No. 62/540,957, filed on Aug. 3, 2017.

(51) Int. Cl.
C08G 61/08    (2006.01)
B01J 31/22    (2006.01)
C08G 61/02    (2006.01)

(52) U.S. Cl.
CPC .......... *C08G 61/08* (2013.01); *B01J 31/2273* (2013.01); *C08G 61/025* (2013.01); *B01J 31/226* (2013.01);
(Continued)

(58) Field of Classification Search
CPC ................ C08G 61/08; C08G 2261/21; C08G 2261/3321; C08G 2261/3322; C08G 2261/418; B01J 31/2273; B01J 2531/821
See application file for complete search history.

(56) References Cited

U.S. PATENT DOCUMENTS 3,790,545 A * 2/1974 Minchak ............ C08G 61/08
526/154
2014/0371454 A1* 12/2014 Hoveyda ............ B01J 31/2278
546/4

FOREIGN PATENT DOCUMENTS

WO    1995/033786    12/1995
WO    2014/201300    12/2014

OTHER PUBLICATIONS

Dall'Asta and Motroni, Die Angewandte Makromolekulare Chemie 16/17 (1971) 51-74.*

(Continued)

*Primary Examiner* — Vu A Nguyen

(57) ABSTRACT

The present disclosure provides cis-polycycloolefins and methods for forming cis-polycycloolefins typically having 50% or greater cis carbon-carbon double bonds comprising contacting a first cyclic hydrocarbyl monomer with a catalyst represented by Formula (I):

(Continued)

wherein: M is a group 8 metal; $Q^1$, $Q^2$, and $Q^3$ are independently oxygen or sulfur; each of $R^1$ and $R^4$ is a halogen; $R^9$ is $C_1$-$C_{40}$ hydrocarbyl or $C_1$-$C_{40}$ substituted hydrocarbyl; and each of $R^2$, $R^3$, $R^5$, $R^6$, $R^7$, $R^8$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl. In at least one embodiment, a polycyclopentene has 50% or greater cis carbon-carbon double bonds.

27 Claims, 4 Drawing Sheets

(52) U.S. Cl.
CPC ........ *B01J 31/2226* (2013.01); *B01J 31/2278* (2013.01); *B01J 2231/14* (2013.01); *B01J 2531/821* (2013.01); *C08G 2261/21* (2013.01); *C08G 2261/3321* (2013.01); *C08G 2261/418* (2013.01)

(56) References Cited

OTHER PUBLICATIONS

SciFinder Search (Oct. 16, 2019).*
Sci Finder Search (Jul. 10, 2020).*
Johns, et al., "High Trans Kinetic Selectivity in Ruthenium-Based Olefin Cross-Metathesis through Stereoretention," Organic Letters, 2016, vol. 18, 772-775.
Keitz, et al., "Cis-Selective Ring-Opening Metathesis Polymerization with Ruthenium Catalysts," Journal of the American Chemical Society, 2012, vol. 134, No. 4, pp. 2040-2043.
Tuba, et al., "Ruthenium catalyzed equilibrium ring-opening metathesis polymerization of cyclopentene," Polymer Chemistry, 2013, vol. 4, pp. 3959-3962.
Hejl, et al., "Ring-Opening Metathesis Polymerization of Functionalized Low-Strain Monomers with Ruthenium-Based Catalysts," Macromolecules, 2005, vol. 38, No. 17, pp. 7214-7218.
Bielawski, et al., "Highly Efficient Ring-Opening Metathesis Polymerization (ROMP) Using New Ruthenium Catalysts Containing N-Heterocyclic Carbene Ligands,"Angew Chem. Int., 2000, vol. 39, No. 16, pp. 2903-2906.
Myers, et al., "Synthesis of narrow-distribution polycyclopentene using a ruthenium ring-opening metathesis initiator," Polymer, 2008, vol. 49, No. 4, pp. 877-882.
Trzaska, "Synthesis of Narrow-Distribution Perfect Polyethylene and Its Block Copolymers by Polymerization of Cyclopentene," Macromolecules, 2000, vol. 33, pp. 9215-9221.
Khan, et al., "Readily Accessible and Easily Modifiable Ru-Based Catalysts for Efficient and Z-Selective Ring-Opening Metathesis Polymerization and Ring-Opening/Cross-Metathesis," Journal of the American Chemical Society, 2013, vol. 135, pp. 10258-10261.
Flook,et al., "Z-Selective Olefin Metathesis Processes Catalyzed by a Molybdenum Hexaisopropylterphenoxide Monopyrrolide Complex," Journal of the American Chemical Society, 2009, vol. 131, pp. 7962-7963.
Opstal et al., "Synthesis of Highly Active Ruthenium Indenylidene Complexes for Atom-Transfer Radical Polymerization and Ring-Opening-Metathesis Polymerization," Angew. Chem. Int. Ed., 2003, vol. 42, No. 25, pp. 2876-2879.
Hilf et al., "End Capping Ring-Opening Olefin Metathesis Polymerization Polymers with Vinyl Lactones," Journal of the American Chemical Society, 2008, vol. 130, No. 33, pp. 11040-11048.
Bielwaski, "Living ring-opening metathesis polymerization," Prog. Polym. Sci., 2007, vol. 32, No. 1, pp. 1-29.
Suriboot, "Controlled Ring-Opening Metathesis Polymerization with Polyisobutylene-Bound Pyridine-Ligated Ru(II) Catalysts," ACS Omega, 2016, vol. 1, pp. 714-721.
Nagarkar, "Efficient Amine End-Functionalization of Living Ring-Opening Metathesis Polymers," Macromolecules, 2012, vol. 45, No. 11, pp. 4447-4453.
Mikus et al., "Controllable ROMP Tacticity by Harnessing the Fluxionality of Stereogenic-at-Ruthenium Complexes," Angew. Chem. Int. Ed., 2006, vol. 55, pp. 4997-5002.
Dounis, P. et al. (1995) "Ring-Opening Metathesis Polymerization of Monocyclic Alkenes using Molybdenum and Tungsten Alkylidene (Schrock-Type) Initiators and $^{13}C$ Nuclear Magnetic Resonance Studies of the Resulting Polyalkenamers," *Polymer*, v.36(14), pp. 2787-2796.
Natta, G. et al. (1964) "Stereospecific Homopolymerization of Cyclopentene,"*Angew. Chem. Int'l*, v.3(11) pp. 723-729.
Samak, B. et al. (2000) "Dramatic Solvent Effects on Ring-Opening Metathesis Polymerization of Cycloalkenes," *Journal of Molecular Catalysis A: Chemical*, v.160, pp. 13-21.
Sanui, K. et al. (1974) "Dynamic Mechanical Properties of a Polypentenamer and its Hydrogenated Derivatives," *Macromolecules*, v.7(1), pp. 101-105.
Yu, et al. (2015) "Catalyst-Controlled Stereoselective Olefin Metathesis as a Principal Strategy in Multi-step Synthesis Design: A Concise Route to (+)-Neopeltolide", *Angew Chem. Int.*, v.54(1), pp. 215-220.
Keitz, et al. (2012) "Cis-Selective Ring-Opening Metathesis Polymerization with Ruthenium Catalysts,"*Jrnl. Amer. Chem. Soc.*, v.134(4), pp. 2040-2043 with Supporting Information, 28 pgs (https://pubs.acs.org/doi/suppl/10.1021/ja211676y/suppl_file/ja211676y_si_001.pdf).

* cited by examiner

CIS-POLYCYCLOOLEFINS AND METHODS FOR FORMING CIS-POLYCYCLOOLEFINS

PRIORITY CLAIM

This application claims priority to and the benefit of U.S. Ser. No. 62/540,957, filed Aug. 3, 2017 and is incorporated by reference in its entirety.

FIELD OF THE INVENTION

The present disclosure provides cis-polycycloolefins and methods for forming cis-polycycloolefins.

BACKGROUND OF THE INVENTION

Polyolefins are widely used commercially because of their robust physical properties. For example, polyolefins having carbon-carbon double bonds along the polymer backbone are of commercial interest as rubber replacements/additives. Polyolefins are typically prepared with a catalyst that polymerizes olefin monomers. Polyolefins, such as polynorbornene, can be synthesized by olefin metathesis from olefin monomers, such as norbornene monomers. Olefin metathesis is an interchange of radicals between two compounds during a chemical reaction. For example, norbornene can be converted to polynorbornene by ring-opening metathesis polymerization (ROMP) using ruthenium catalysts. The resultant polynorbornene can be used in the rubber industry and has a glass transition temperature of 39.9° C.

Since its discovery in the 1950s, olefin metathesis has emerged as a valuable synthetic method for the formation of carbon-carbon double bonds (olefins). In particular, its recent advances in applications to organic syntheses and polymer syntheses rely on developments of well-defined catalysts. Among attempts to improve catalyst efficiency over the past decade, one of the most attractive areas of research and development has been selective synthesis of stereo-controlled olefin products (trans (E) selectivity versus cis (Z) selectivity). However, most metathesis catalysts provide polyolefins having predominantly the thermodynamically favored trans (E) isomer of carbon-carbon double bonds along the polyolefin backbone. In particular, catalysts and methods for forming polycyclopentene and polycyclooctene are highly trans (E) selective (greater than 80% trans (E) content of a formed polyolefin). Furthermore, cyclopentene monomer has a very low ring strain of −6.8 kcal/mol, which makes it a difficult monomer to polymerize using ROMP as compared to, for example, norbornene which has a ring strain of 27.2 kcal/mol.

Polyolefins having a high content (e.g., greater than 50%) of cis (Z) carbon-carbon double bonds along the polymer backbone are of commercial interest because of their low melting points (e.g., −20° C.), low glass transition temperature (e.g., −100° C.) and slow rates of crystallization, which make them ideal candidates for rubber replacements or additives to provide low temperature operability.

There exists a need for cis-polycycloolefins and methods of forming polyolefins, such as polycyclopentene and polycyclooctene, having 50% or greater cis carbon-carbon double bonds.

References of interest include: WO 2014/201300, WO 1995/033786, Adam M. Johns, et al., "High Trans Kinetic Selectivity in Ruthenium-Based Olefin Cross-Metathesis through Stereoretention," Org. Lett., 2016, 18, 772-775; Benjamin K. Keitz, et al., "Cis-Selective Ring-Opening Metathesis Polymerization with Ruthenium Catalysts," J. Am. Chem. Soc., 2012, 134(4), 2040-2043; Robert Tuba, et al., "Ruthenium catalyzed equilibrium ring-opening metathesis polymerization of cyclopentene," Polym. Chem., 2013, 4, 3959-3962; Andrew Hejl, et al., "Ring-Opening Metathesis Polymerization of Functionalized Low-Strain Monomers with Ruthenium-Based Catalysts," Macromolecules, 2005, 38, 7214-7218; Christopher W. Bielawski, et al., "Highly Efficient Ring-Opening Metathesis Polymerization (ROMP) Using New Ruthenium Catalysts Containing N-Heterocyclic Carbene Ligands," Angew Chem. Int., 2000, 39(16), 2903-2906; Sasha B. Myers, et al., "Synthesis of narrow-distribution polycyclopentene using a ruthenium ring-opening metathesis initiator," Polymer, 2008, 49, 877-882; Scott T. Trzaska, "Synthesis of Narrow-Distribution Perfect Polyethylene and Its Block Copolymers by Polymerization of Cyclopentene," Macromolecules, 2000, 33, 9215-9221; R. Kashif M. Khan, et al., "Readily Accessible and Easily Modifiable Ru-Based Catalysts for Efficient and Z-Selective Ring-Opening Metathesis Polymerization and Ring-Opening/Cross-Metathesis," J. Am. Chem. Soc., 2013, 135, 10258-10261; Margaret M. Flook, et al., "Z-Selective Olefin Metathesis Processes Catalyzed by a Molybdenum Hexaisopropylterphenoxide Monopyrrolide Complex," J. Am. Chem. Soc., 2009, 131, 7962-7963; Tom Opstal, et al., "Synthesis of Highly Active Ruthenium Indenylidene Complexes for Atom-Transfer Radical Polymerization and Ring-Opening-Metathesis Polymerization," Angew. Chem. Int. Ed., 2003, 42, 2876-2879; Hilf, et al., "End Capping Ring-Opening Olefin Metathesis Polymerization Polymers with Vinyl Lactones," J. Am. Chem. Soc., 2008, 130(33), 11040-11048; Christopher W. Bielwaski, "Living ring-opening metathesis polymerization," Frog. Polym. Sci., 2007, 32, 1-29; Jakkrit Suriboot, "Controlled Ring-Opening Metathesis Polymerization with Polyisobutylene-Bound Pyridine-Ligated Ru(II) Catalysts," ACS Omega, 2016, 1, 714-721; Amit A. Nagarkar, "Efficient Amine End-Functionalization of Living Ring-Opening Metathesis Polymers," Macromolecules, 2012, 45(11), 4447-4453.

SUMMARY OF THE INVENTION

The present disclosure provides cis-polycycloolefins and methods for forming cis-polycycloolefins.

In at least one embodiment, a method for forming a polyolefin having 50% or greater cis carbon-carbon double bonds includes contacting a first cyclic hydrocarbyl monomer with a catalyst represented by Formula (I):

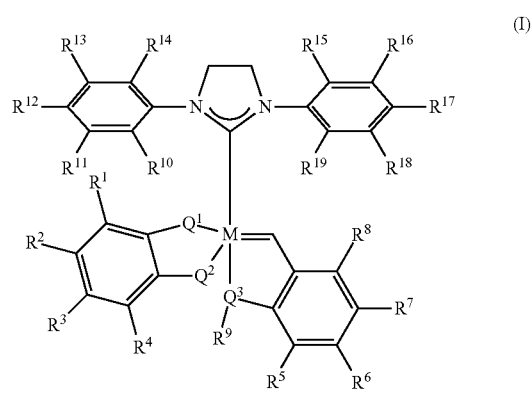

wherein:
M is a group 8 metal;
$Q^1$, $Q^2$, and $Q^3$ are independently oxygen or sulfur;
each of $R^1$ and $R^4$ is a halogen;
$R^9$ is $C_1$-$C_{40}$ hydrocarbyl or $C_1$-$C_{40}$ substituted hydrocarbyl; and
each of $R^2$, $R^3$, $R^5$, $R^6$, $R^7$, $R^8$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl.

In at least one embodiment, a polycyclopentene having 50% or greater cis carbon-carbon double bonds is provided.

DETAILED DESCRIPTION

Figure 1:
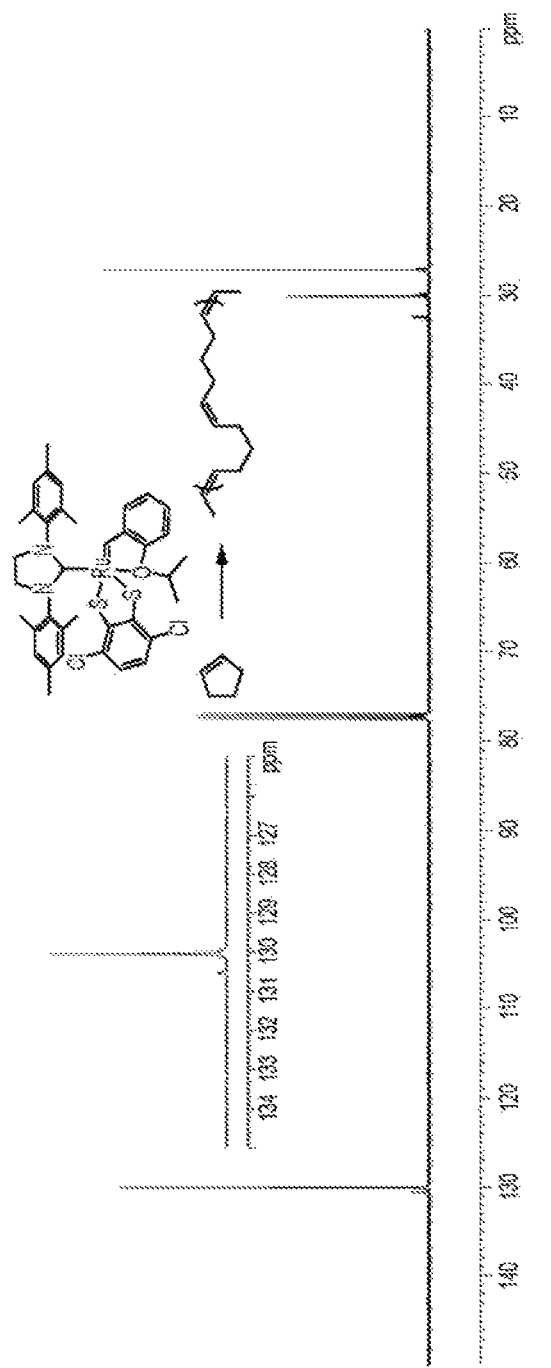
FIG. 1 is a carbon ($^{13}$C) nuclear magnetic resonance spectrum of polycyclopentene formed using a catalyst, according to an embodiment of the present disclosure.

The present disclosure provides cis-polycycloolefins and methods for forming cis-polycycloolefins. In at least one embodiment, a method for forming a polyolefin having 50% or greater cis carbon-carbon double bonds includes contacting a first cyclic hydrocarbyl monomer with a catalyst represented by Formula (I):

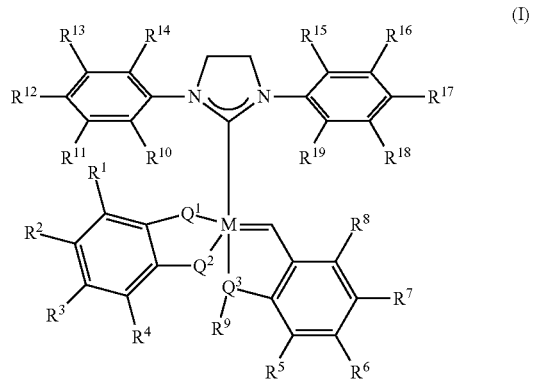

(I)

wherein:
M is a group 8 metal;
$Q^1$, $Q^2$, and $Q^3$ are independently oxygen or sulfur;
each of $R^1$ and $R^4$ is a halogen;
$R^9$ is $C_1$-$C_{40}$ hydrocarbyl or $C_1$-$C_{40}$ substituted hydrocarbyl; and
each of $R^2$, $R^3$, $R^5$, $R^6$, $R^7$, $R^8$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl.

Methods of the present disclosure provide polyolefins having 50% or greater cis (Z) carbon-carbon double bonds along the polymer backbone.

Theoretical studies suggest that a 100% cis (Z) polycyclopentene, for example, would have a melting point of –40° C. and low glass transition temperature of –115° C. This invention relates to polyolefins having 50% or greater cis carbon-carbon double bonds and melting points of about –20° C. or less, glass transition temperature of about –100° C. or less, and slow rates of crystallization, which make them ideal candidates for rubber replacements or additives to provide low temperature operability.

The term "ring-opening metathesis polymerization" as used herein includes polymerizing a cyclic olefin monomer. Monomers include cyclopentene and cyclooctene. The polymer formed has a plurality of carbon-carbon double bonds along the polymer backbone.

The term "polyolefin" as used herein includes polymers of two or more olefin monomer (mer) units. An "olefin," alternatively referred to as "alkene," is a linear, branched, or cyclic compound of carbon and hydrogen having at least one double bond. A "mono-olefin" has one double bond, either alpha or internal.

The terms "cis" and "(Z)" as used herein are used interchangeably and refers to the cis configuration of carbon-carbon double bonds of a polymer backbone. Cis can refer to a carbon-carbon double bond represented by the structure:

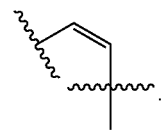 [SMILES: */C=C\*]

The terms "trans" and "(E)" as used herein are used interchangeably and refers to the trans configuration of carbon-carbon double bonds of a polymer backbone. Trans can refer to a carbon-carbon double bond represented by the structure:

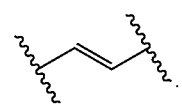

As used herein, when a polymer or copolymer is referred to as comprising an olefin, for example cyclopentene, the olefin present in such polymer or copolymer is the polymerized form of the olefin. For example, when a copolymer, for example, is said to have a "cyclopentene" at 35 wt % to 55 wt %, it is understood that the mer unit in the copolymer is derived from cyclopentene in the polymerization reaction and the derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the term "copolymer," as used herein, includes terpolymers. An oligomer is typically a polymer having a low molecular weight (such as a number average molecular weight (Mn) of less than 25,000 g/mol, preferably less than 2,500 g/mol) or a low number of mer units (such as 75 mer units or less, typically 50 mer units or less, even 20 mer units or less, even 10 mer units or less).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is the value of Mw divided by Mn. Unless otherwise noted, all molecular weight units (e.g., Mw, Mn, Mz) are g/mol. Carbon number is determined by $^1$H NMR as set out in the Experimental section below.

As used herein, the notation for the Periodic Table Groups is used as described in Chemical and Engineering News, 63(5), 27 (1985). Room temperature is 23° C. unless otherwise noted.

The terms "hydrocarbyl radical," "hydrocarbyl," and "hydrocarbyl group" as used herein are used interchangeably. Likewise the terms "group" and "substituent" are also used interchangeably. For purposes of this disclosure, "hydrocarbyl radical" includes $C_1$ to $C_{20}$ radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with a heteroatom or heteroatom containing group, preferably with at least one functional group such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, where $R^*$ is, independently, hydrogen or a hydrocarbyl.

A "substituted alkyl" or "substituted aryl" group is an alkyl or aryl radical made of carbon and hydrogen where at least one hydrogen is replaced by a heteroatom, a heteroatom containing group, or a linear, branched, or cyclic substituted or unsubstituted hydrocarbyl group having 1 to 30 carbon atoms.

Catalysts:

In at least one embodiment, a catalyst for forming a polyolefin having 50% or greater cis carbon-carbon double bonds is represented by Formula (I):

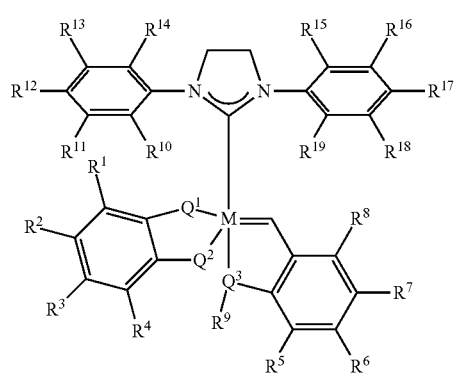

wherein:
M is a group 8 metal;
$Q^1$, $Q^2$, and $Q^3$ are independently oxygen or sulfur;
each of $R^1$ and $R^4$ is a halogen (such as chlorine or bromine, typically chlorine);
$R^9$ is $C_1$-$C_{40}$ hydrocarbyl or $C_1$-$C_{40}$ substituted hydrocarbyl; and
each of $R^2$, $R^3$, $R^5$, $R^6$, $R^7$, $R^8$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl.

In at least one embodiment, M is ruthenium or osmium.
In at least one embodiment, $Q^1$ and $Q^2$ are sulfur and $Q^3$ is oxygen.

Each of $R^{10}$, $R^{12}$, $R^{14}$, $R^{15}$, $R^{17}$, and $R^{19}$ can be independently $C_1$-$C_{40}$ hydrocarbyl. In at least one embodiment, each of $R^{10}$, $R^{12}$, $R^{14}$, $R^{15}$, $R^{17}$, and $R^{19}$ is a $C_1$-$C_{40}$ hydrocarbyl independently selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl. Each of $R^{11}$, $R^{13}$, $R^{16}$, and $R^{18}$ can be hydrogen.

Each of $R^2$, $R^3$, $R^5$, $R^6$, $R^7$, and $R^8$ can be independently hydrogen or $C_1$-$C_{40}$ hydrocarbyl. In at least one embodiment, each of $R^2$, $R^3$, $R^5$, $R^6$, $R^7$, and $R^8$ is hydrogen. $R^9$ can be a $C_1$-$C_{40}$ hydrocarbyl selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl.

In at least one embodiment, $R^1$ and $R^4$ are chlorine.
In at least one embodiment, a catalyst for forming a polyolefin having 50% or greater cis carbon-carbon double bonds is represented by Formula (II):

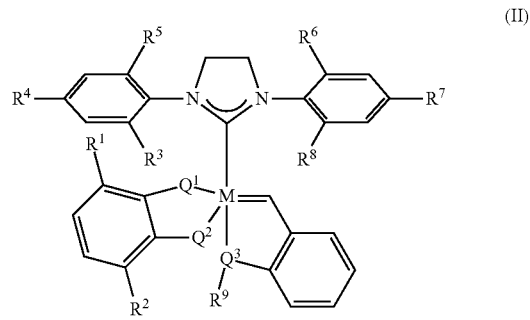

wherein:
M is a group 8 metal such as ruthenium or osmium;
$Q^1$, $Q^2$, and $Q^3$ are independently oxygen or sulfur;
each of $R^1$ and $R^2$ is halogen (such as chlorine or bromine);
$R^9$ is $C_1$-$C_{40}$ hydrocarbyl or $C_1$-$C_{40}$ substituted hydrocarbyl; and
each of $R^3$, $R^4$, $R^5$, $R^6$, $R^7$, and $R^8$ is independently hydrogen, halogen, $C_1$-$C_{40}$ hydrocarbyl or $C_1$-$C_{40}$ substituted hydrocarbyl.

In at least one embodiment, M is ruthenium. $Q^1$ and $Q^2$ are sulfur and $Q^3$ is oxygen. Each of $R^3$, $R^4$, $R^5$, $R^6$, $R^7$, and $R^8$ is independently $C_1$-$C_{40}$ hydrocarbyl. In at least one embodiment, each of $R^3$, $R^4$, $R^5$, $R^6$, $R^7$, and $R^8$ is a $C_1$-$C_{40}$ hydrocarbyl independently selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl.

$R^9$ is a $C_1$-$C_{40}$ hydrocarbyl selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl.

$R^1$ and $R^4$ can be chlorine.

In at least one embodiment, a catalyst for forming a polyolefin having 50% or greater cis carbon-carbon double bonds is represented by Formula (III):

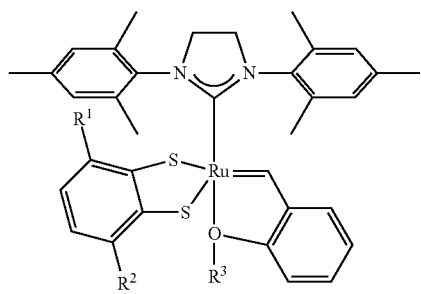
(III)

wherein:

each of $R^1$ and $R^2$ is halogen (such as chlorine); and $R^3$ is $C_1$-$C_{40}$ hydrocarbyl or $C_1$-$C_{40}$ substituted hydrocarbyl.

$R^3$ can be a $C_1$-$C_{40}$ hydrocarbyl selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl. $R^1$ and $R^2$ can be chlorine.

In at least one embodiment, a catalyst for forming a polyolefin having 50% or greater cis carbon-carbon double bonds is:

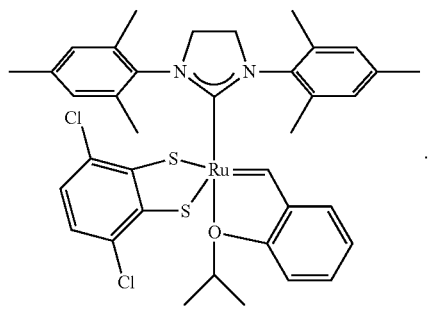

Methods to Prepare Catalyst Compounds

Generally, catalysts of Formula (I) may be synthesized according to the schematic reaction procedure shown in Schemes 1 and 2. All air sensitive syntheses should be carried out under inert atmosphere, for example, in a nitrogen purged dry box. All solvents are available from commercial sources. Zinc acetate hydrate and hydrazine are available from commercial sources. As shown in Scheme 1, an aryl diol or aryl dithiol is treated with zinc acetate hydrate and hydrazine to form a hydrazine chelated zinc diol or dithiol. The hydrazine chelated zinc diol or dithiol is then treated with an N-heterocyclic carbene-containing metal compound to form the catalyst represented by Formula (I).

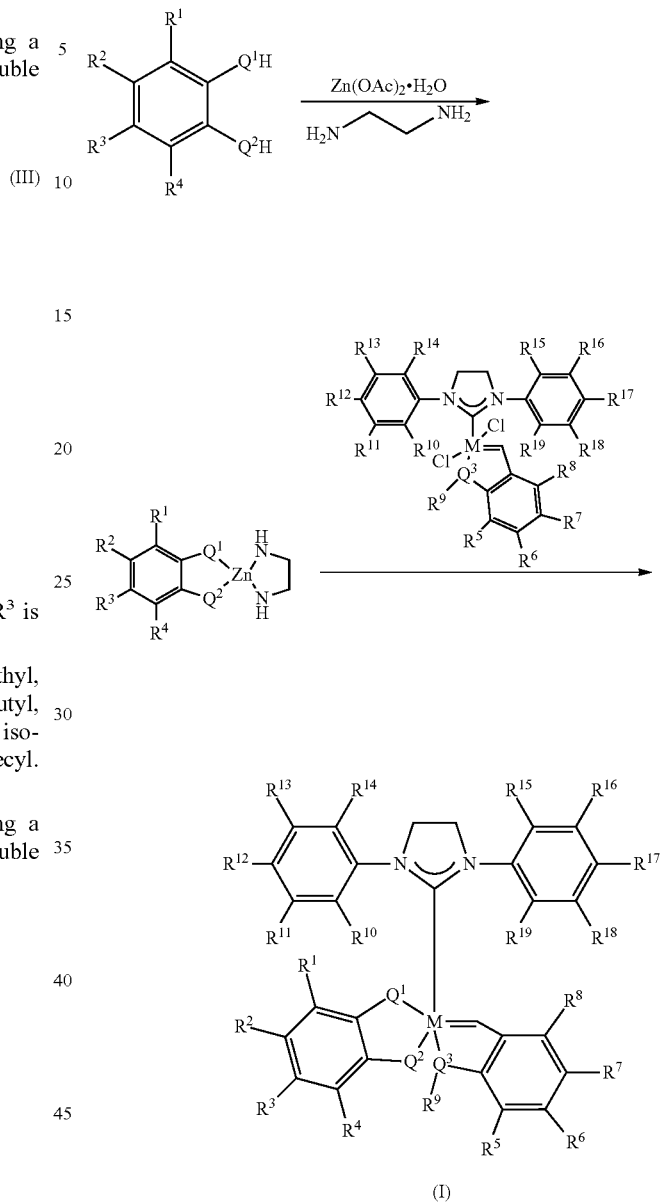

As shown in Scheme 2, 3,6-dichlorobenzene-1,2-dithiol is treated with zinc acetate hydrate and hydrazine to form zinc complex 1. Zinc complex 1 is then treated with ruthenium complex 2 to form catalyst compound 3.

Scheme 2

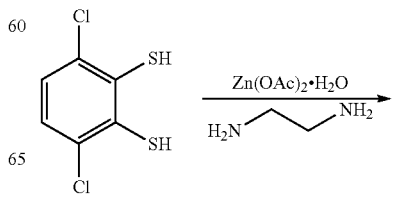

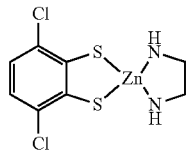
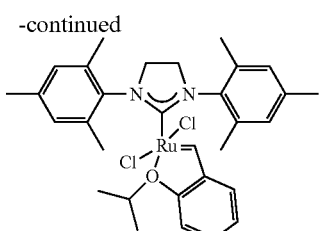

1

2

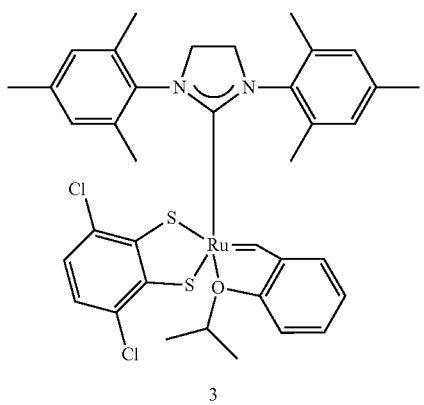

3

Methods for Forming Polyolefins:

Methods of the present disclosure include polymerizing olefin monomers to form a polyolefin having 50% or greater cis carbon-carbon double bonds. Polymerizing olefin monomers can be performed by contacting an olefin monomer with an olefin metathesis catalyst under polymerization conditions. In at least one embodiment, polymerizing olefin monomers is a ring-opening metathesis polymerization (ROMP). In at least one aspect, an olefin metathesis catalyst can be immobilized on a silica support material before contacting the olefin metathesis catalyst with an olefin monomer.

Methods of the present disclosure provide polyolefins having 50% or greater cis carbon-carbon double bonds, such as about 60% or greater, such as about 70% or greater, such as about 80% or greater, such as about 90% or greater, such as about 91% or greater, such as about 92% or greater, such as about 93% or greater, such as about 94% or greater, such as about 95% or greater, such as about 96% or greater, such as about 97% or greater, such as about 98% or greater, such as about 99% or greater. In at least one embodiment, a method of the present disclosure provides polyolefins having from about 85% to about 95% cis carbon-carbon double bonds, such as from about 88% to about 93% cis carbon-carbon double bonds, such as from about 90% to about 92% cis carbon-carbon double bonds.

Olefin monomers include cyclopentene, cyclooctene, cyclooctadiene, cyclopropene, cyclobutene, cyclohexene, methylcyclohexene, cycloheptene, norbornadiene, norbornene, cyclobutadiene, cyclohexadiene, cycloheptadiene, cyclooctatetraene, 1,5-cyclooctadiene, 1,5-dimethyl-1,5-cyclooctadiene, 1,2-dimethylcyclopent-1-ene, 1-methylcyclopent-1-ene, and dicyclopentadiene. Preferably, an olefin monomer is one or more of cyclopentene, cyclooctene, and cyclooctadiene. In at least one embodiment, an olefin monomer is cyclopentene. Olefin monomers can be unsubstituted or substituted at one or more carbon atoms with $C_1$-$C_{40}$ hydrocarbyl. One or more of the substituted olefin monomers can join together to form a saturated or unsaturated cyclic $C_5$-$C_{10}$ hydrocarbyl.

Polymerizing olefin monomers to form a polyolefin having 50% or greater cis carbon-carbon double bonds can be performed in an inert atmosphere by dissolving a catalytically effective amount of a catalyst in a solvent, and adding the olefin monomer, optionally dissolved in a solvent, to the catalyst solution to form a reaction solution. The reaction solution can be agitated (e.g., stirred). The progress of the polymerization occurring in the reaction solution can be monitored by, for example, nuclear magnetic resonance spectroscopy.

Solvents useful herein include any suitable organic solvent that is inert under the polymerization conditions. Solvents include aromatic hydrocarbons, chlorinated hydrocarbons, ethers, aliphatic hydrocarbons, alcohols, or mixtures thereof. Preferred solvents include benzene, toluene, p-xylene, methylene chloride, 1,2-dichloroethane, dichlorobenzene, chlorobenzene, tetrahydrofuran, diethylether, pentane, methanol, or ethanol. In one embodiment, the solvent is one or more of toluene or 1,2-dichloroethane.

Alternatively, polymerizing olefin monomers is performed 'neat', e.g. without the presence of a solvent in a reaction mixture. In such embodiments, the reaction mixture comprises only catalyst and olefin monomers, followed by subsequent polymerization of the olefin monomers in the reaction mixture. The olefin monomers can be a diluent for the catalyst and polymer product.

A temperature of the reaction mixture during polymerization can be maintained at any suitable temperature using a standard heating and/or cooling device. Reaction temperatures can range from about 0° C. to about 100° C., such as from about 25° C. to about 75° C., for example room temperature (e.g., about 23° C.). A reaction can be performed (e.g., stirring and/or heating of the reaction mixture) for any suitable amount of time, for example, until completion of the reaction. In at least one embodiment, a reaction time is from about 12 hours to about 48 hours, such as from about 15 hours to about 24 hours, for example about 18 hours.

The molar ratio of cyclic olefin monomer to the catalyst can be selected based on the desired molecular weight of the polymer, desired polydispersity index (PDI), and the activity of a particular catalyst.

In some embodiments, the turnover number (TON) of a compound of Formula (I) in polymerizing the olefin monomers is from about 500 to about 50,000, such as from about 5,000 to about 45,000, such as from about 10,000 to about 30,000, such as from about 20,000 to about 25,000. Catalyst turnover number (TON) for production of the metathesis products of the present disclosure is defined as the [micromoles of metathesis product]/([micromoles of catalyst included in the reaction mixture].

In at least one embodiment, a reaction mixture comprises a loading of a catalyst of Formula (I) that is about 8 mol % or less, relative to the olefin(s). In some embodiments, the loading of a catalyst of Formula (I) in a metathesis reaction is from about 0.0005 mol % to about 8 mol %, such as from about 0.001 mol % to about 4 mol %, such as from 0.005 mol % to about 2 mol %, such as from about 0.01 mol % to about 1.5 mol %, such as from about 0.02 mol % to about 1 mol %, such as from about 0.03 mol % to about 0.5 mol %.

In at least one embodiment, a method for forming a polyolefin having 50% or greater cis carbon-carbon double bonds includes contacting a first cyclic hydrocarbyl monomer with a catalyst represented by Formula (I):

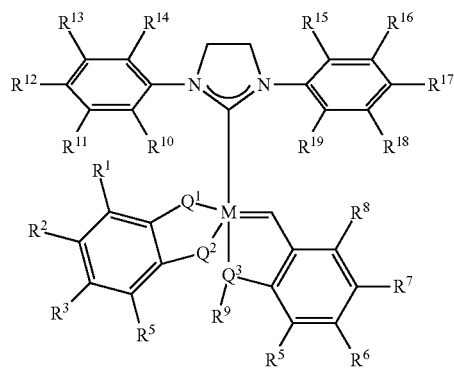

(I)

wherein:

M is a group 8 metal;

$Q^1$, $Q^2$, and $Q^3$ are independently oxygen or sulfur;

each of $R^1$ and $R^4$ is a halogen (such as chlorine or bromine);

$R^9$ is $C_1$-$C_{40}$ hydrocarbyl or $C_1$-$C_{40}$ substituted hydrocarbyl; and each of $R^2$, $R^3$, $R^5$, $R^6$, $R^7$, $R^8$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl.

In at least one embodiment, the cyclic hydrocarbyl is a $C_5$ cyclic olefin or a $C_8$ cyclic olefin. The cyclic hydrocarbyl can be a $C_5$ cyclic olefin that is cyclopentene. The cyclic hydrocarbyl can be a $C_8$ cyclic olefin that is cyclooctene or cyclooctadiene. In at least one embodiment, M is ruthenium or osmium. In at least one embodiment, $Q^1$ and $Q^2$ are sulfur and $Q^3$ is oxygen.

Each of $R^{10}$, $R^{12}$, $R^{14}$, $R^{15}$, $R^{17}$, and $R^{19}$ can be independently $C_1$-$C_{40}$ hydrocarbyl. In at least one embodiment, each of $R^{10}$, $R^{12}$, $R^{14}$, $R^{15}$, $R^{17}$, and $R^{19}$ is a $C_1$-$C_{40}$ hydrocarbyl independently selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl. Each of $R^{11}$, $R^{13}$, $R^{16}$, and $R^{18}$ can be hydrogen.

Each of $R^2$, $R^3$, $R^5$, $R^6$, $R^7$, and $R^8$ can be independently hydrogen or $C_1$-$C_{40}$ hydrocarbyl, preferably selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl. In at least one embodiment, each of $R^2$, $R^3$, $R^5$, $R^6$, $R^7$, and $R^8$ is hydrogen. $R^9$ can be a $C_1$-$C_{40}$ hydrocarbyl selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl. In at least one embodiment, $R^1$ and $R^4$ are chlorine.

In at least one embodiment, a method for forming a polyolefin having 50% or greater cis carbon-carbon double bonds includes contacting a first cyclic hydrocarbyl monomer with a catalyst represented by Formula (II):

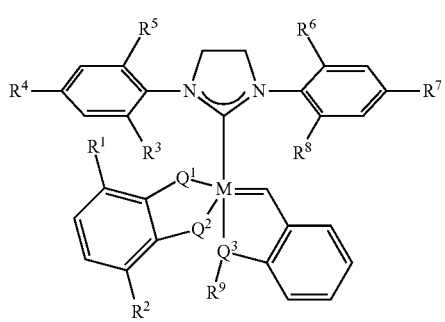

(II)

wherein:

M is a group 8 metal such as ruthenium or osmium;

$Q^1$, $Q^2$, and $Q^3$ are independently oxygen or sulfur;

each of $R^1$ and $R^2$ is halogen;

$R^9$ is $C_1$-$C_{40}$ hydrocarbyl or $C_1$-$C_{40}$ substituted hydrocarbyl; and each of $R^3$, $R^4$, $R^5$, $R^6$, $R^7$, and $R^8$ is independently hydrogen, halogen, $C_1$-$C_{40}$ hydrocarbyl or $C_1$-$C_{40}$ substituted hydrocarbyl.

In at least one embodiment, M is ruthenium. $Q^1$ and $Q^2$ can be sulfur and $Q^3$ can be oxygen. Each of $R^3$, $R^4$, $R^5$, $R^6$, $R^7$, and $R^8$ can be independently $C_1$-$C_{40}$ hydrocarbyl. In at least one embodiment, each of $R^3$, $R^4$, $R^5$, $R^6$, $R^7$, and $R^8$ is a $C_1$-$C_{40}$ hydrocarbyl independently selected from methyl, ethyl, and propyl.

$R^9$ can be a $C_1$-$C_{40}$ hydrocarbyl selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl. $R^1$ and $R^4$ can be chlorine.

In at least one embodiment, a method for forming a polyolefin having 50% or greater cis carbon-carbon double bonds includes contacting a first cyclic hydrocarbyl monomer with a catalyst represented by Formula (III):

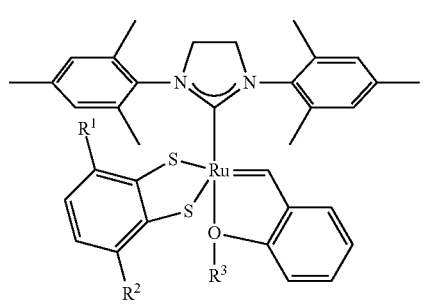

(III)

wherein:

each of $R^1$ and $R^2$ is halogen; and $R^3$ is $C_1$-$C_{40}$ hydrocarbyl or $C_1$-$C_{40}$ substituted hydrocarbyl. $R^3$ can be a $C_1$-$C_{40}$ hydrocarbyl selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl. $R^1$ and $R^2$ can be chlorine.

In at least one embodiment, a method for forming a polyolefin having 50% or greater cis carbon-carbon double bonds includes contacting a first cyclic hydrocarbyl monomer with the catalyst:

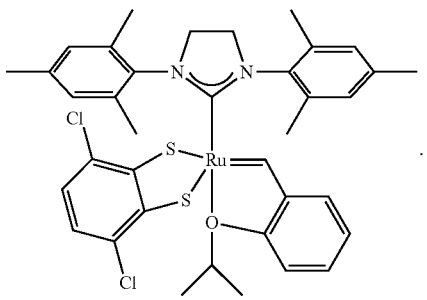

In at least one embodiment, one catalyst compound is used, e.g., the catalyst compounds in a reaction mixture are not different. For purposes of the present disclosure, one catalyst compound is considered different from another if they differ by at least one atom. For example, chlorobenzene is different from benzene, which is different from dichlorobenzene. In at least one embodiment, two or more different catalysts are present in a reaction mixture used herein. Two or more different catalyst compounds include a first catalyst represented by formula (I), (II), or (III) and a second catalyst represented by formula (I), (II), or (III). When two different catalysts are used in one reaction mixture, the two catalysts are preferably chosen such that the two are compatible. A simple screening method such as by $^1$H or $^{13}$C NMR, known to those of ordinary skill in the art, can be used to determine which catalysts are compatible.

The catalyst compound represented by formula (I), (II), or (III) and the second catalyst compound represented by formula (I), (II), or (III) may be used in any ratio (A:B). The first catalyst compound represented by formula (I), (II), or (III) may be (A) if the second catalyst compound is (B). Alternatively, the first catalyst compound represented by formula (I), (II), or (III) may be (B) if the second catalyst compound is (A). Molar ratios of (A) to (B) can fall within the range of (A:B) about 1:1000 to about 1000:1, such as between about 1:100 and about 500:1, such as between about 1:10 and about 200:1, such as between about 1:1 and about 100:1, such as about 1:1 to about 75:1, such as about 5:1 to about 50:1. The ratio chosen will depend on the exact catalysts chosen and the end product (polymer) desired. In at least one embodiment, when using the two catalyst compounds, useful mole percents, based upon the molecular weight of the catalyst compounds, are between about 10 to about 99.9% of (A) to about 0.1 and about 90% of (B), such as between about 25 and about 99% (A) to about 0.5 and about 50% (B), such as between about 50 and about 99% (A) to about 1 and about 25% (B), such as between about 75 and about 99% (A) to about 1 to about 10% (B).

One or more quench agents can be added to a polymerization reaction of the present disclosure to terminate olefin polymerization. The quench agent can form an end cap on one or both termini of the polymer formed from olefin polymerization. Quench agents include any suitable quenching agent. Quench agents can include an ether, vinylene carbonate, 3H-furanone, an amine, or benzaldehyde. Ethers include ethyl vinyl ether, propyl vinyl ether, butyl vinyl ether, pentyl vinyl ether, or hexyl vinyl ether Amines include 2-phenoxy-1,3,4,7-tetrahydro-1,3,2-diazaphosphepine 2-oxide.

In certain embodiments, the catalyst compound utilized in a method of the present disclosure can be bound to or deposited on a solid catalyst support. The solid catalyst support will render the catalyst compound heterogeneous. The catalyst support can increase catalyst strength and attrition resistance. Catalyst supports include silicas, aluminas, silica-aluminas, aluminosilicates, including zeolites and other crystalline porousaluminosilicates, as well as titanias, zirconia, magnesium oxide, carbon, and cross-linked, reticular polymeric resins, such as functionalized cross-linked polystyrenes, e.g., chloromethyl-functionalized cross-linked polystyrenes. The catalyst compound can be deposited onto the support by any method known to those skilled in the art, including, for example, impregnation, ion-exchange, deposition-precipitation, and vapor deposition. Alternatively, the catalyst compound can be chemically bound to the support via one or more covalent chemical bonds, for example, the catalyst compound can be immobilized by one or more covalent bonds with one or more of substituents of the ligands of the catalyst.

If a catalyst support is used, the catalyst compound can be loaded onto the catalyst support in any amount, provided that the method proceeds to the desired metathesis products. Generally, the catalyst compound is loaded onto the support in an amount that is greater than about 0.01 wt % of the Group 8 metal, and preferably greater than about 0.05 wt % of the Group 8 metal, based on the total weight of the catalyst compound plus support. Generally, the catalyst compound is loaded onto the support in an amount that is less than about 20 wt % of the Group 8 metal, and preferably less than about 10 wt % of the Group 8 metal, based on the total weight of the catalyst compound and support.

Copolymerization

Methods of the present disclosure can further include contacting the catalyst of formula (I), (II), or (III) with one or more second olefin monomers different than the first cyclic hydrocarbyl monomer to form a polyolefin copolymer.

The second olefin monomer can be a single cyclic or linear olefin, or a combination of cyclic and/or linear olefins, that is a mixture of two or more different olefins. The cyclic olefins may be strained or unstrained, monocyclic, or polycyclic; and may optionally include heteroatoms and/or one or more substituents. Suitable cyclic olefins include norbornene, norbornadiene, dicyclopentadiene, cyclopentene, cycloheptene, cyclooctene, cyclooctadiene, cyclododecene, 7-oxanorbornene, 7-oxanorbornadiene, cyclopropene, cyclobutene, cyclohexene, methylcyclohexene, cyclobutadiene, cyclohexadiene, cycloheptadiene, cyclooctatetraene, 1,5-dimethyl-1,5-cyclooctadiene, and substituted derivatives therefrom. A second olefin monomer can be substituted with one or more of hydroxyl, thiol, ketone, aldehyde, ester, ether, amine, imine, amide, nitro, carboxylic acid, disulfide, carbonate, isocyanate, carbodiimide, carboalkoxy, and halogen. Preferred cyclic olefins include cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Second olefin monomers also include linear olefins. Any suitable linear mono-olefin may be used. A linear olefin can be an alpha olefin. The term "alpha olefin" includes an olefin where the carbon-carbon double bond occurs between the alpha and beta carbons of the carbon chain. Alpha olefins may be represented by the formula: $H_2C=CH-R^*$, where $R^*$ is hydrogen or a $C_1$ to $C_{30}$ hydrocarbyl; preferably, a $C_2$ to $C_{20}$ hydrocarbyl; preferably, a $C_3$ to $C_{12}$ hydrocarbyl; preferably, methyl, ethyl, propyl, butyl, pentyl, heptyl, octyl, nonyl, decyl, undecyl, and dodecyl. In at least one embodiment, a second olefin monomer is one or more of 1-pentene 1-hexene, 1-heptene, and 1-decene.

A linear olefin can be an internal olefin. The term "internal olefin" includes a compound having a double bond that is not between the alpha and beta carbons of the carbon chain. Internal olefins may be represented by the formula: R*—HC=CH—R*, wherein each R* is independently, a $C_1$ to $C_{30}$ hydrocarbyl; preferably, a $C_2$ to $C_{20}$ hydrocarbyl; preferably, a $C_2$ to $C_{12}$ hydrocarbyl; preferably, methyl, ethyl, propyl, butyl, pentyl, and hexyl. In at least one embodiment, a second olefin monomer is one or more of hex-2-ene, hept-3-ene, and dec-5-ene.

Useful linear olefins can be substituted at any position along the carbon chain with one or more substituents. In some embodiments, the one or more substituents are essentially inert with respect to the catalyst of formula (I), (II), or (III). Substituents include alkyl (preferably, $C_{1-6}$ alkyl), cycloalkyl (preferably, $C_{3-6}$ cycloalkyl), hydroxy, ether, keto, aldehyde, and halogen functionalities.

Preferred linear olefins include ethylene, propylene, butene, pentene, hexene, octene, nonene, decene undecene, dodecene, and the isomers thereof (particularly the isomers where the double bond is in the alpha position and isomers where the double bond is not in the alpha position). Alternatively, a linear olefin includes dec-5-ene, 1-pentene, 1-decene, and 1-octene.

A second cyclic hydrocarbyl monomer can be added to a reaction mixture at the onset of a polymerization reaction which promotes random copolymer formation. Alternatively, the second cyclic hydrocarbyl monomer can be added to a reaction mixture after a polymerization of the first cyclic hydrocarbyl monomer has been performed. This sequential addition of a second cyclic hydrocarbyl monomer promotes block copolymer formation.

A polyolefin copolymer formed by a method of the present disclosure has about 50% or greater cis carbon-carbon double bonds, such as about 60% or greater cis carbon-carbon double bonds, such as about 70% or greater cis carbon-carbon double bonds, such as about 80% or greater cis carbon-carbon double bonds, such as about 90% or greater cis carbon-carbon double bonds, such as about 91% or greater cis carbon-carbon double bonds, such as about 92% or greater cis carbon-carbon double bonds, such as about 93% or greater cis carbon-carbon double bonds, such as about 94% or greater cis carbon-carbon double bonds, such as about 95% or greater cis carbon-carbon double bonds, such as about 96% or greater cis carbon-carbon double bonds, such as about 97% or greater cis carbon-carbon double bonds, such as about 98% or greater cis carbon-carbon double bonds, such as about 99% or greater cis carbon-carbon double bonds.

In at least one embodiment, a copolymer formed by methods of the present disclosure is a random or block poly-[cyclopentene]-[dicyclopentadiene]; poly-[cyclopentene]-[cyclooctene]; or poly-[cyclopentene]-[cyclooctadiene].

Polymerization and Copolymerization in a Reactor

Methods of the present disclosure can be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe, or pump. The processes may be conducted in either glass lined, stainless steel, or similar type reaction equipment. Useful reaction vessels include reactors (including continuous stirred tank reactors, batch reactors, reactive extruder, pipe, or pump, continuous flow fixed bed reactors, slurry reactors, fluidized bed reactors, and catalytic distillation reactors). The reaction zone may be fitted with one or more internal and/or external heat exchanger(s) in order to control undue temperature fluctuations, or to prevent "runaway" reaction temperatures.

If the process is conducted in a continuous flow reactor, then the weight hourly space velocity, given in units of grams feed material (such as a cycloolefin) per gram catalyst per hour ($h^{-1}$), will determine the relative quantities of feed material to catalyst employed, as well as the residence time in the reactor of the unsaturated starting compound. In a flow reactor, the weight hourly space velocity of the unsaturated feed material is typically greater than about 0.04 g feed material (such as a cycloolefin) per g catalyst per hour ($h^{-1}$), and preferably, greater than about 0.1 $h^{-1}$. In a flow reactor, the weight hourly space velocity of the feed material is typically less than about 100 $h^{-1}$, and preferably, less than about 20 $h^{-1}$.

The quantity of metathesis catalyst that is employed in the process of this invention is any quantity that provides for an operable metathesis reaction. Preferably, the ratio of moles of feed material to moles of metathesis catalyst is typically greater than about 10:1, preferably greater than about 100:1, preferably greater than about 1000:1, preferably greater than about 10,000:1, preferably greater than about 25,000:1, preferably greater than about 50,000:1, preferably greater than about 100,000:1. Alternately, the molar ratio of feed material to metathesis catalyst is typically less than about 10,000,000:1, preferably less than about 1,000,000:1, and more preferably less than about 500,000:1.

The contacting time of the reagents and catalyst in a batch reactor can be any duration, provided that the desired olefin metathesis products are obtained. Generally, the contacting time in a reactor is greater than about 5 minutes, and preferably greater than about 10 minutes. Generally, the contacting time in a reactor is less than about 25 hours, preferably less than about 15 hours, and more preferably less than about 10 hours.

In a preferred embodiment, the reactants (for example, metathesis catalyst; cycloolefins) are combined in a reaction vessel at a temperature of 20° C. to 300° C. (preferably 20° C. to 200° C., preferably 30° C. to 100° C., preferably 40° C. to 60° C.) and an alkene (such as ethylene) at a pressure of 0.1 to 1000 psi (0.7 kPa to 6.9 MPa) (preferably 20 to 400 psi (0.14 MPa to 2.8 MPa), preferably 50 to 250 psi (0.34 MPa to 1.7 MPa)), for a residence time of 0.5 seconds to 48 hours (preferably 0.25 to 5 hours, preferably 30 minutes to 2 hours).

In certain embodiments, where the alkene is a gaseous olefin, the olefin pressure is greater than about 5 psig (34.5 kPa), preferably greater than about 10 psig (68.9 kPa), and more preferably greater than about 45 psig (310 kPa). When a diluent is used with the gaseous alkene, the aforementioned pressure ranges may also be suitably employed as the total pressure of olefin and diluent. Likewise, when a liquid alkene is employed and the process is conducted under an inert gaseous atmosphere, then the aforementioned pressure ranges may be suitably employed for the inert gas pressure.

In a preferred embodiment, from about 0.005 nmoles to about 500 nmoles, preferably from about 0.1 to about 250 nmoles, and most preferably from about 1 to about 50 nmoles of the metathesis catalyst are charged to the reactor per 3 mmoles of feed material charged.

Typically, the conversion of feed material is greater than about 50 mol %, preferably greater than about 60 mol %, and more preferably greater than about 70 mol %.

In a preferred embodiment, the process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately, no solvent or diluent is present or added in the reaction medium, (except for the small amounts used as the carrier for the catalyst or other additives, or amounts typically found with the reactants; e.g., propane in propylene).

Polymers

The present disclosure also provides compositions of matter which can be produced by the methods described herein.

Polymers of the present disclosure can have a glass transition temperature (Tg), as determined by the DSC procedure described herein, from about −120° C. to about −20° C., such as from −115° C. to −50° C., −115° C. to −70° C., −115° C. to −90° C., −110° C. to −90° C.

Polymers of the present disclosure can have a melting temperature (Tm), as determined by the DSC procedure described herein, from about −60° C. to about 0° C., such as from −40° C. to −25° C., −40° C. to −20° C., −35° C. to −25° C., −40° C. to −15° C., or −35° C. to −15° C.; or alternatively from −20° C. to −2° C., such as from −15° C. to −2° C., such as from −10° C. to −2° C., such as from −5° C. to −2° C.

The DSC procedures for determining glass transition temperature (Tg) and melting point (Tm) of polymers of the present disclosure include the following. The polymer is pressed at a temperature of from 200° C. to 230° C. in a heated press, and the resulting polymer sheet is hung, under ambient conditions (of 20° C.-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min to −30° C. to −50° C. and held for 10 minutes at −50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt," respectively, are recorded. Reference to melting point temperature and glass transition temperature herein refers to the first melt.

In at least one embodiment, a polyolefin formed by a method of the present disclosure has a melting point of from about −40° C. to about −20° C. A polyolefin formed by a method of the present disclosure can have a glass transition temperature from about −100° C. to about −115° C. In at least one embodiment, a polyolefin formed by a method of the present disclosure is a polycyclopentene having 50% or greater cis carbon-carbon double bonds, such as 60% or greater cis carbon-carbon double bonds, such as 70% or greater cis carbon-carbon double bonds, such as 80% or greater cis carbon-carbon double bonds, such as 90% or greater cis carbon-carbon double bonds, such as 91% or greater cis carbon-carbon double bonds, such as 92% or greater cis carbon-carbon double bonds, such as 93% or greater cis carbon-carbon double bonds, such as 93% or greater cis carbon-carbon double bonds, such as 94% or greater cis carbon-carbon double bonds, such as 95% or greater cis carbon-carbon double bonds, such as 96% or greater cis carbon-carbon double bonds, such as 97% or greater cis carbon-carbon double bonds, such as 98% or greater cis carbon-carbon double bonds, such as 99% or greater cis carbon-carbon double bonds.

In at least one embodiment, a polyolefin of the present disclosure is a polycyclopentene represented by Formula (IV):

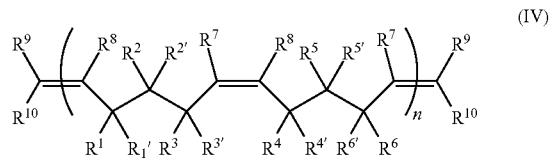

n is a positive integer. In one embodiment, n is from about 1 to about 50,000, such as from about 1,000 to about 10,000, such as from about 5,000 to about 8,000. Each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$ is independently hydrogen, $C_1$-$C_{40}$ hydrocarbyl, or $R^1$ and $R^3$, $R^1$ and $R^2$, $R^4$ and $R^5$, or $R^4$ and $R^6$ join together to form a saturated or unsaturated cyclic $C_5$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$ and $R^{6'}$ is independently hydrogen or $C_1$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$ and $R^{6'}$ is hydrogen. $R^7$ and $R^8$ are preferably hydrogen. $R^9$ and $R^{10}$ are independently hydrogen or an end cap. End caps include ether, amine, aryl, or carboxylic acid. Ether includes ethyl ether, propyl ether, butyl ether, pentyl ether, or hexyl ether. The polyolefin represented by Formula (IV) can be formed by methods of the present disclosure.

In at least one embodiment, a polyolefin of the present disclosure is a polycyclooctene represented by Formula (V):

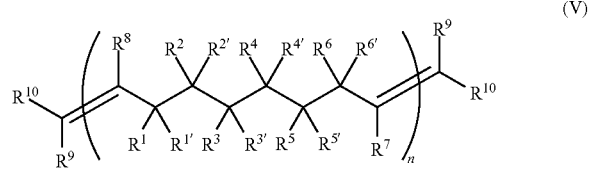

n is a positive integer. In one embodiment, n is from about 1 to about 50,000, such as from about 1,000 to about 10,000, such as from about 5,000 to about 8,000. Each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, and $R^8$ is independently hydrogen, $C_1$-$C_{40}$ hydrocarbyl, or $R^1$ and $R^3$, $R^1$ and $R^2$, $R^4$ and $R^5$, or $R^4$ and $R^6$ join together to form a saturated or unsaturated cyclic $C_5$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$ and $R^{6'}$ is independently hydrogen or $C_1$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$ and $R^{6'}$ is hydrogen. $R^7$ and $R^8$ are preferably hydrogen. $R^9$ and $R^{10}$ are independently hydrogen or an end cap. End caps include ether, amine, aryl, or carboxylic acid. Ether includes ethyl ether, propyl ether, butyl ether, pentyl ether, or hexyl ether. The polyolefin represented by Formula (V) can be formed by methods of the present disclosure.

In at least one embodiment, a polyolefin of the present disclosure is a polycyclooctadiene represented by Formula (VI):

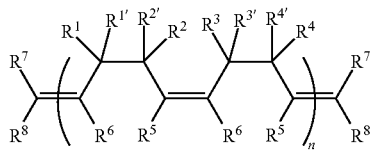

(VI)

n is a positive integer. In one embodiment, n is from about 1 to about 50,000, such as from about 1,000 to about 10,000, such as from about 5,000 to about 8,000. Each of $R^1$, $R^{1'}$, $R^2$, $R^{2'}$, $R^3$, $R^{3'}$, $R^4$, $R^{4'}$, $R^5$, and $R^6$ is independently hydrogen, $C_1$-$C_{40}$ hydrocarbyl, or $R^1$ and $R^2$, or $R^3$ and $R^4$ join together to form a saturated or unsaturated cyclic $C_5$-$C_{10}$ hydrocarbyl. In at least one embodiment, each of $R^1$, $R^{1'}$, $R^2$, $R^{2'}$, $R^3$, $R^{3'}$, $R^4$, and $R^{4'}$ is independently hydrogen or $C_1$-$C_{10}$ hydrocarbyl. In at least one embodiment, each of $R^1$, $R^{1'}$, $R^2$, $R^{2'}$, $R^3$, $R^{3'}$, $R^4$, and $R^{4'}$ is hydrogen. $R^5$ and $R^6$ are preferably hydrogen. $R^7$ and $R^8$ are independently hydrogen or an end cap. End caps include ether, amine, aryl, or carboxylic acid. Ether includes ethyl ether, propyl ether, butyl ether, pentyl ether, or hexyl ether. The polyolefin represented by Formula (VI) can be formed by methods of the present disclosure.

In at least one embodiment, a polyolefin of the present disclosure is a polydicyclopentadiene represented by formulas (VIIa), (VIIb), or (VIIc):

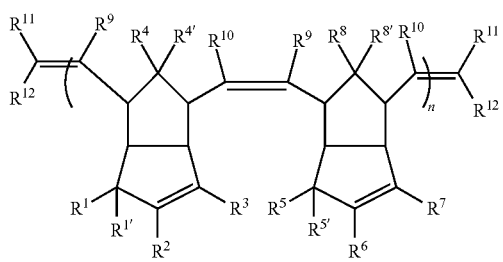

(VIIa)

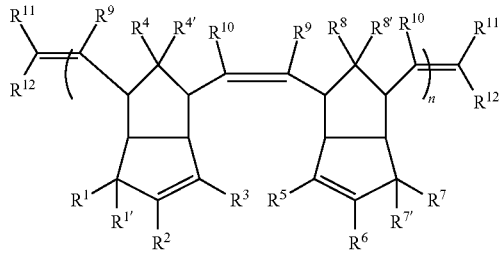

(VIIb)

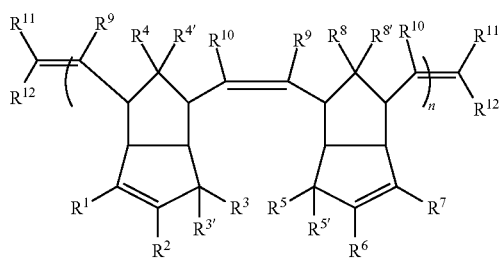

(VIIc)

n is a positive integer. In one embodiment, n is from about 1 to about 50,000, such as from about 1,000 to about 10,000, such as from about 5,000 to about 8,000. Each of $R^1$, $R^{1'}$, $R^2$, $R^3$, $R^{3'}$, $R^4$, $R^{4'}$, $R^5$, $R^{5'}$, $R^6$, $R^7$, $R^{7'}$, $R^8$, $R^{8'}$, $R^9$ and $R^{10}$ is independently hydrogen, $C_1$-$C_{40}$ hydrocarbyl, or $R^1$ and $R^2$, $R^2$ and $R^3$, $R^5$ and $R^6$, or $R^6$ and $R^7$ join together to form a saturated or unsaturated cyclic $C_5$-$C_{10}$ hydrocarbyl. In at least one embodiment, each of $R^1$, $R^{1'}$, $R^2$, $R^3$, $R^{3'}$, $R^4$, $R^{4'}$, $R^5$, $R^{5'}$, $R^6$, $R^7$, $R^{7'}$, $R^8$, and $R^{8'}$ is independently hydrogen or $C_1$-$C_{10}$ hydrocarbyl. In at least one embodiment, each of $R^1$, $R^{1'}$, $R^2$, $R^3$, $R^{3'}$, $R^4$, $R^{4'}$, $R^5$, $R^{5'}$, $R^6$, $R^7$, $R^{7'}$, $R^8$, and $R^{8'}$ is hydrogen. $R^7$ and $R^8$ are preferably hydrogen. $R^{11}$ and $R^{12}$ are independently hydrogen or an end cap. End caps include ether, amine, aryl, or carboxylic acid. Ether includes ethyl ether, propyl ether, butyl ether, pentyl ether, or hexyl ether. The polyolefin represented by formulas (VIIa), (VIIb), and (VIIc) can be formed by methods of the present disclosure.

A polymer of the present disclosure can be a copolymer that is a random or block copolymer. In at least one embodiment, a copolymer is a poly-[cyclopentene]-[dicyclopentadiene]; poly-[cyclopentene]-[cyclooctene]; or poly-[cyclopentene]-[cyclooctadiene].

In at least one embodiment, a poly-[cyclopentene]-[dicyclopentadiene] is represented by Formula (VIII):

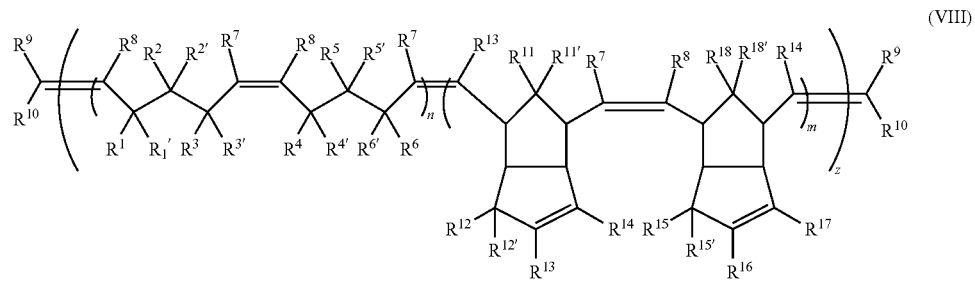

(VIII)

Each of n, m, and z is a positive integer. In one embodiment, n is from about 1 to about 25,000, such as from about 500 to about 5,000, such as from about 2,500 to about 4,000. m is from about 1 to about 25,000, such as from about 500 to about 5,000, such as from about 2,500 to about 4,000. z is from about 1 to about 5,000, such as from about 100 to about 3,000, such as from about 300 to about 1,000. Each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{14}$, $R^{15}$, $R^{15'}$, $R^{16}$, $R^{17}$, $R^{18}$, and $R^{18'}$ is independently hydrogen, $C_1$-$C_{40}$ hydrocarbyl, or $R^1$ and $R^2$, $R^2$ and $R^3$, $R^4$ and $R^5$, $R^5$ and $R^6$, $R^{12}$ and $R^{13}$, $R^{13}$ and $R^{14}$, $R^{15}$ and $R^{16}$, or $R^{16}$ and $R^{17}$ join together to form a saturated or unsaturated cyclic $C_5$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{14}$, $R^{15}$, $R^{15'}$, $R^{16}$, $R^{17}$, $R^{18}$, and $R^{18'}$ is independently hydrogen or $C_1$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{14}$, $R^{15}$, $R^{15'}$, $R^{16}$, $R^{17}$, $R^{18}$, and $R^{18'}$ is hydrogen. $R^7$ and $R^8$ are preferably hydrogen. $R^9$ and $R^{10}$ are independently hydrogen or an end cap. End caps include ether, amine, aryl, or carboxylic acid. Ether includes ethyl ether, propyl ether, butyl ether, pentyl ether, or hexyl ether. The polyolefin represented by Formula (VIII) can be formed by methods of the present disclosure.

In at least one embodiment, a poly-[cyclopentene]-[cyclooctene] is represented by Formula (IX):

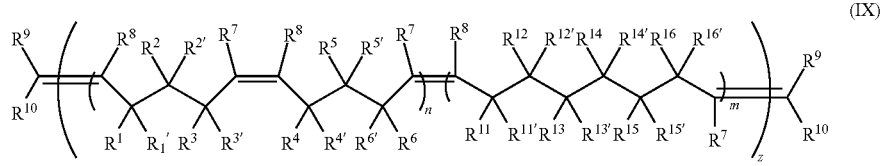

(IX)

Each of n, m, and z is a positive integer. In one embodiment, n is from about 1 to about 25,000, such as from about 500 to about 5,000, such as from about 2,500 to about 4,000. m is from about 1 to about 25,000, such as from about 500 to about 5,000, such as from about 2,500 to about 4,000. z is from about 1 to about 5,000, such as from about 100 to about 3,000, such as from about 300 to about 1,000. Each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{13'}$, $R^{14}$, $R^{14'}$, $R^{15}$, $R^{15'}$, $R^{16}$ and $R^{16'}$ is independently hydrogen, $C_1$-$C_{40}$ hydrocarbyl, or $R^1$ and $R^2$, $R^2$ and $R^3$, $R^4$ and $R^5$, $R^5$ and $R^6$, $R^{11}$ and $R^{12}$, $R^{12}$ and $R^{13}$, $R^{13}$ and $R^{14}$, $R^{14}$ and $R^{15}$, or $R^{15}$ and $R^{16}$ join together to form a saturated or unsaturated cyclic $C_5$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{13'}$, $R^{14}$, $R^{14'}$, $R^{15}$, $R^{15'}$, $R^{16}$, and $R^{16'}$ is independently hydrogen or $C_1$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{13'}$, $R^{14}$, $R^{14'}$, $R^{15}$, $R^{15'}$, $R^{16}$, and $R^{16'}$ is hydrogen. $R^7$ and $R^8$ are preferably hydrogen. $R^9$ and $R^{10}$ are independently hydrogen or an end cap. End caps include ether, amine, aryl, or carboxylic acid. Ether includes ethyl ether, propyl ether, butyl ether, pentyl ether, or hexyl ether. The polyolefin represented by Formula (IX) can be formed by methods of the present disclosure.

In at least one embodiment, a poly-[cyclopentene]-[cyclooctadiene] is represented by Formula (X):

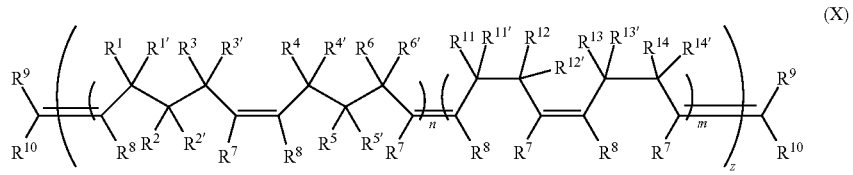

(X)

Each of n, m, and z is a positive integer. In one embodiment, n is from about 1 to about 25,000, such as from about 500 to about 5,000, such as from about 2,500 to about 4,000. m is from about 1 to about 25,000, such as from about 500 to about 5,000, such as from about 2,500 to about 4,000. z is from about 1 to about 5,000, such as from about 100 to about 3,000, such as from about 300 to about 1,000. Each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{13'}$, $R^{14}$, and $R^{14'}$ is independently hydrogen, $C_1$-$C_{40}$ hydrocarbyl, or $R^1$ and $R^2$, $R^2$ and $R^3$, $R^4$ and $R^5$, $R^5$ and $R^6$, $R^{11}$ and $R^{12}$, or $R^{13}$ and $R^{14}$ join together to form a saturated or unsaturated cyclic $C_5$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{13'}$, $R^{14}$, and $R^{14'}$ is independently hydrogen or $C_1$-$C_{10}$ hydrocarbyl. In at least one embodiment, each of $R^1$, $R^{1'}$, $R^2$, $R^{2'}$, $R^3$, $R^{3'}$, $R^4$, $R^{4'}$, $R^5$, $R^{5'}$, $R^6$, $R^{6'}$, $R^7$, $R^8$, $R^{11}$, $R^{11'}$, $R^{12}$, $R^{12'}$, $R^{13}$, $R^{13'}$, $R^{14}$, and $R^{14'}$ is hydrogen. $R^7$ and $R^8$ are preferably hydrogen. $R^9$ and $R^{10}$ are independently hydrogen or an end cap. End caps include ether, amine, aryl, or carboxylic acid. Ether includes ethyl ether, propyl ether, butyl ether, pentyl ether, or hexyl ether. The polyolefin represented by Formula (X) can be formed by methods of the present disclosure.

The polymers represented by the formulas (IV), (V), (VI), (VIIa), (VIIb), (VIIc), (VIII), (IX), and (X) have 50% or greater cis carbon-carbon double bonds, such as 60% or greater cis carbon-carbon double bonds, such as 70% or greater cis carbon-carbon double bonds, such as 80% or greater cis carbon-carbon double bonds, such as 90% or greater cis carbon-carbon double bonds, such as 91% or greater cis carbon-carbon double bonds, such as 92% or greater cis carbon-carbon double bonds, such as 93% or greater cis carbon-carbon double bonds, such as 93% or greater cis carbon-carbon double bonds, such as 94% or greater cis carbon-carbon double bonds, such as 95% or greater cis carbon-carbon double bonds, such as 96% or greater cis carbon-carbon double bonds, such as 97% or greater cis carbon-carbon double bonds, such as 98% or greater cis carbon-carbon double bonds, such as 99% or greater cis carbon-carbon double bonds.

In at least one embodiment, a polymer as described herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In at least one embodiment, the polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 93/03093, published Feb. 18, 1993, specifically columns 7 and 8 as well as in Wild et al., J. Poly. Sci., Poly. Phys. Ed., Vol. 20, pg. 441 (1982) and U.S. Pat. No. 5,008,204, including that fractions having a weight average molecular weight (Mw) below 15,000 are ignored when determining CDBI.

Blends

In at least one embodiment, a polymer of the present disclosure (such as polycyclopentene or polycyclooctene) is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polycyclopentene or polycyclooctene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above) can be mixed together prior to being put into an extruder or may be mixed in an extruder. The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

In at least one embodiment, the method of blending the polymers may be to melt-blend the polymers in a batch mixer, such as a Banbury™ or Brabender™ mixer. Blending may include melt blending the first polymer and the second polymer in an extruder, such as a single-screw extruder or a twin-screw extruder. Extrusion technology for polymer blends is well known in the art, and is described in more detail in, for example, *PLASTICS EXTRUSION TECHNOLOGY*, F. Hensen, Ed. (Hanser, 1988), pp. 26-37, and in *POLYPROPYLENE HANDBOOK*, E. P. Moore, Jr. Ed. (Hanser, 1996), pp. 304-348.

The first polymer and the second polymer may also be blended by a combination of methods, such as dry blending followed by melt blending in an extruder, or batch mixing of some components followed by melt blending with other components in an extruder. The first polymer and the second polymer may also be blended using a double-cone blender, ribbon blender, or other suitable blender, or in a Farrel Continuous Mixer (FCM™).

Films

Specifically, any of the foregoing polymers, such as the foregoing polycyclopentenes, polycyclooctenes, or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

EXPERIMENTAL

Polymerizations:

Cyclic olefin was added to a vessel containing a catalyst and stirred with a magnetic stir bar until viscosity increased. Ethyl vinyl ether (solvent) was added and stirred with the polymer for several minutes. The polymer was washed with acetone and volatiles removed under vacuum.

Quantitative $^{13}$C NMR was obtained on a Bruker 500 NMR spectrometer. NMR data was collected at 120° C. using a 10 mm CryoProbe with the Bruker spectrometer at a frequency, for example, of 500 MHz (available from Bruker Corporation, United Kingdom). Samples were prepared by dissolving a few milligrams of sample in 3 mL of solvent heated at 140° C. Peak assignments are determined referencing the solvent, for example, CDCl$_3$.

All molecular weights are number average (Mn) unless otherwise noted. All molecular weights are reported in g/mol unless otherwise noted.

For purposes of this invention and the claims thereto, Et is ethyl, Me is methyl, Ph is phenyl, Cy is cyclohexyl, THF is tetrahydrofuran, MeOH is methanol, DCM is dichloromethane, and TLC is thin layer chromatography.

Typical dry-box procedures for synthesis of air-sensitive compounds were followed including using dried glassware (90° C., 24 hours) and anhydrous solvents purchased from Sigma Aldrich (St. Louis, Mo.) which were further dried over 3 Å sieves. All reagents were purchased from Sigma-Aldrich, unless otherwise noted.

Yields of metathesis product and catalyst turnover numbers were calculated from data recorded on an Agilent 6890 GC spectrometer as shown below.

Typically, a sample of the metathesis product will be taken and analyzed by GC. An internal standard, usually tetradecane, is used to derive the amount of metathesis product that is obtained. The amount of metathesis product is calculated from the area under the desired peak on the GC trace, relative to the internal standard.

Yield is reported as a percentage and is generally calculated as 100×[micromoles of metathesis products obtained by GC]/[micromoles of feed material weighed into reactor].

Selectivity is reported as a percentage and was calculated as 100×[area under the peak of desired metathesis products]/[sum of peak areas of cross-metathesis and the homometathesis products].

The inventive catalyst 1 (IC1) was synthesized according to the synthesis reported in Johns, A., et al., Org. Lett., 2016, 18, 772-775. The comparative "Grubbs2" catalyst 1 (CC1) was prepared according to synthetic methods reported in Johns, A., et al., Org. Lett., 2016, 18, 772-775.

EXAMPLES

The inventive catalyst 1 (IC1) (shown below) was used for polymerization of olefin monomers. Comparative catalyst 1 (CC1) (shown below) was used for comparative polymerizations of olefin monomers. ("PCy$_3$" of CC1 is tricyclohexyl phosphine.)

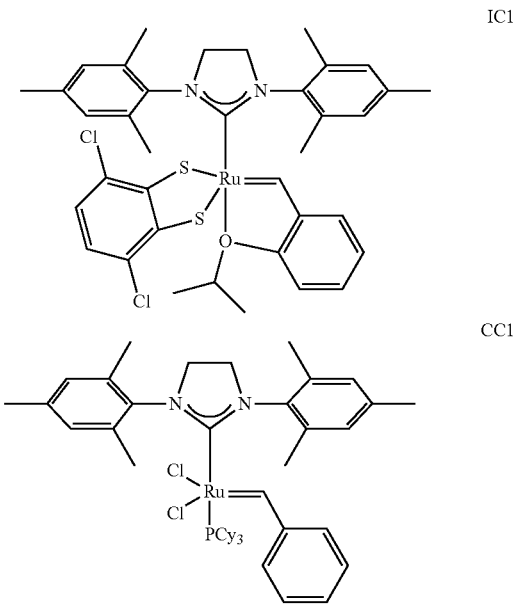

Analysis of the polymers formed by catalysts IC1 and CC1 was performed by quantitative $^{13}$C NMR. Table 1 illustrates results of polymerizations using catalysts IC1 and CC1 with various olefin monomers. As shown in Table 1, cis double bond content of polymers formed by catalyst IC1 was, for example 91% for polycyclopentene, far exceeding the cis content of previously documented polycyclopentene. Polycyclooctene and polycyclooctadiene was also obtained having high cis content. Isolated yields were determined by rotary evaporation of the reaction mixture and weighing the residual.

TABLE 1

| Olefin Monomer | Catalyst (mol %) | Reaction Time | Isolated Yield | cis:trans |
|---|---|---|---|---|
| Cyclopentene | (0.028%) IC1 | 18 h | 19% | 91:9 |
| Cyclopentene | (0.028%) IC1, in CH$_2$Cl$_2$ | 2 weeks | 10% | 67:33 |
| Cyclopentene | (0.025%) CC1 | 5 min | 84% | 17:83 |
| Cyclooctene | (0.023%) IC1 | 18 h | 19% | 95:5 |
| Cyclooctene | (0.015%) CC1 | 45 min | Quant. | Insoluble |
| Norbornene | (0.014%) IC1 | 10 min | 50% | |
| Norbornene | (0.013%) CC1 | 5 min | Quant. | Insoluble |
| Cyclooctadiene | (0.017%) IC1 | 1 h | 23% | 100:0 |

FIG. 1 is a carbon ($^{13}$C) nuclear magnetic resonance spectrum of polycyclopentene formed using catalyst IC1. As shown in FIG. 1, the $^{13}$C peak at 130 ppm is indicative of $^{13}$C carbon atoms of carbon-carbon double bonds of the polymer that are in a cis (Z) configuration. The $^{13}$C peak at 130.5 is indicative of $^{13}$C carbon atoms of carbon-carbon double bonds of the polymer that are in a trans (Z) configuration. The integration of each of these peaks (at 130 ppm and 130.5 ppm) can be taken and compared to provide overall relative cis (Z) versus trans (E) content of the polycyclopentene. As shown in FIG. 1, the polycyclopentene has 91% cis (Z) carbon-carbon double bonds and 9% trans (E) carbon-carbon double bonds. The peaks at 27 ppm, 30 ppm, and 32.5 ppm are methylene carbons of the polycyclopentene. In particular, the peak at 27 ppm is indicative of a methylene carbon alpha to a carbon-carbon double bond in a cis (Z) configuration, whereas the peak at 32.5 ppm is indicative of a methylene carbon alpha to a carbon-carbon double bond in a trans (E) configuration. The three peaks at 77 ppm are $CDCl_3$ solvent.

Figure 2:
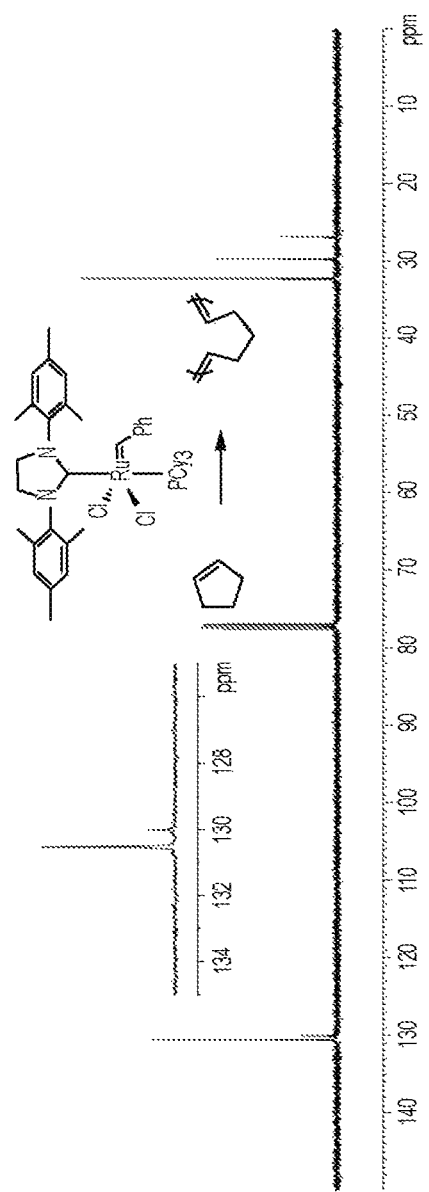
FIG. 2 is a carbon ($^{13}$C) nuclear magnetic resonance spectrum of polycyclopentene formed using a catalyst, according to an embodiment of the present disclosure.

FIG. 2 is a carbon ($^{13}C$) nuclear magnetic resonance spectrum of polycyclopentene formed using catalyst CC1. Like FIG. 1, the $^{13}C$ peak at 130 ppm of FIG. 2 is indicative of $^{13}C$ carbon atoms of carbon-carbon double bonds of the polymer that are in a cis (Z) configuration. The $^{13}C$ peak at 130.5 is indicative of $^{13}C$ carbon atoms of carbon-carbon double bonds of the polymer that are in a trans (Z) configuration. The relative integrations of these peaks (at 130 ppm and 130.5 ppm) indicate that the polycyclopentene product formed by catalyst CC1 has 17% cis carbon-carbon double bonds and 83% trans carbon-carbon double bonds. The peaks at 27 ppm, 30 ppm, and 32.5 ppm are methylene carbons of the polycyclopentene. In particular, the peak at 27 ppm is indicative of a methylene carbon alpha to a carbon-carbon double bond in a cis (Z) configuration, whereas the peak at 32.5 ppm is indicative of a methylene carbon alpha to a carbon-carbon double bond in a trans (E) configuration. The three peaks at 77 ppm are $CDCl_3$ solvent.

Figure 3:
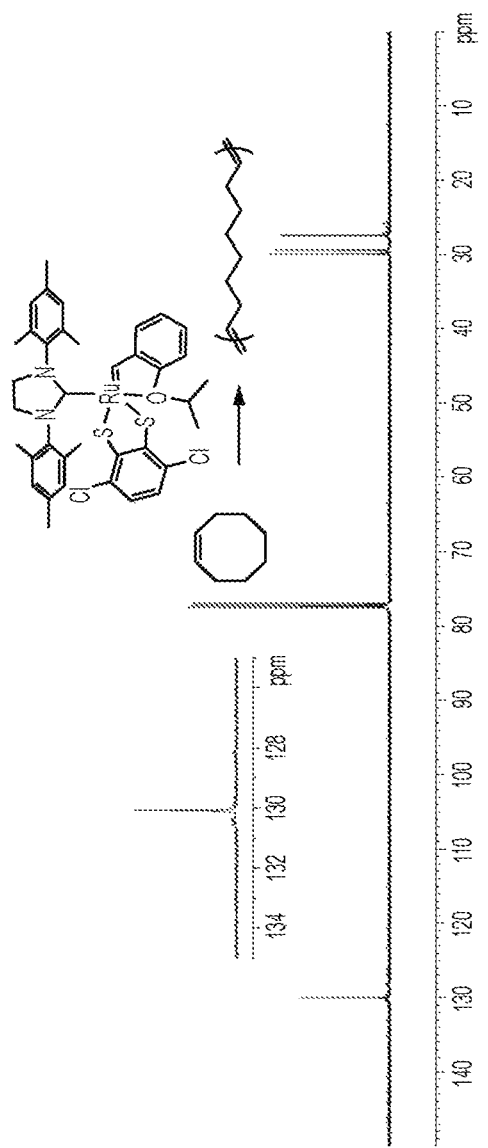
FIG. 3 is a carbon ($^{13}$C) nuclear magnetic resonance spectrum of polycyclooctene formed using a catalyst, according to an embodiment of the present disclosure.

FIG. 3 is a carbon ($^{13}C$) nuclear magnetic resonance spectrum of polycyclooctene formed using catalyst IC1. As shown in FIG. 3, the $^{13}C$ peak at 130.1 ppm is indicative of $^{13}C$ carbon atoms of carbon-carbon double bonds of the polymer that are in a cis (Z) configuration. The $^{13}C$ peak at 130.5 ppm is indicative of $^{13}C$ carbon atoms of carbon-carbon double bonds of the polymer that are in a trans (Z) configuration. The integration of each of these peaks (at 130.1 ppm and 130.5 ppm) can be taken and compared to provide overall relative cis (Z) versus trans (E) content of the polycyclooctene. As shown in FIG. 3, the polycyclooctene product has 95% cis carbon-carbon double bonds and 5% trans carbon-carbon double bonds. The peaks at 27 ppm, 29 ppm, and 30 ppm are methylene carbons of the polycyclopentene. The three peaks at 77 ppm are $CDCl_3$ solvent.

Figure 4:
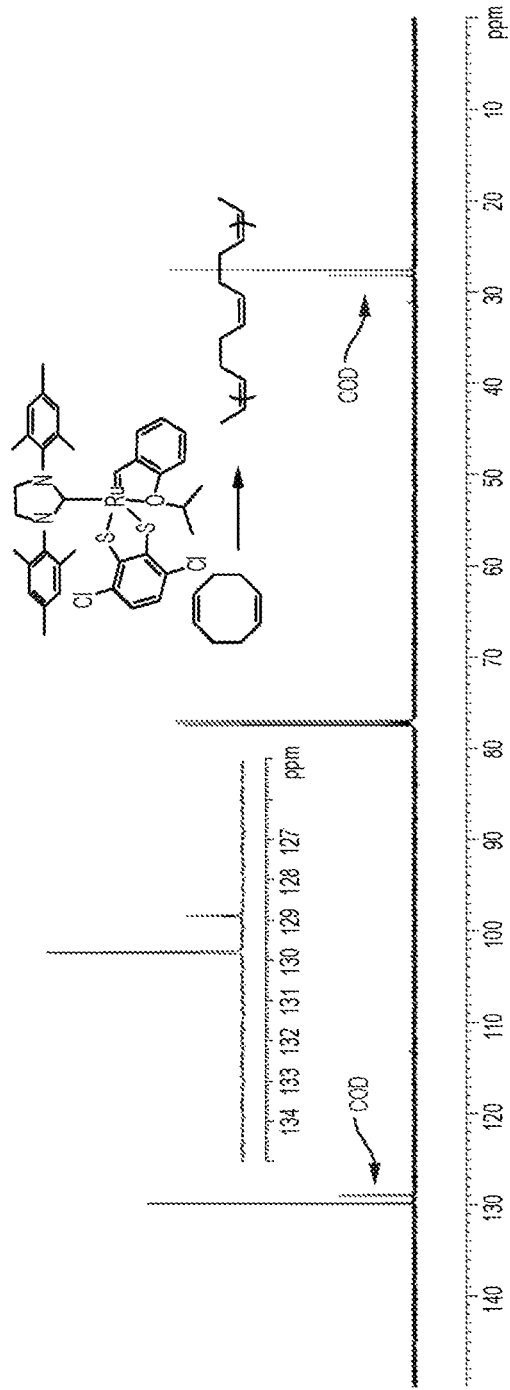
FIG. 4 is a carbon ($^{13}$C) nuclear magnetic resonance spectrum of polycyclooctadiene formed using a catalyst, according to an embodiment of the present disclosure.

FIG. 4 is a carbon ($^{13}C$) nuclear magnetic resonance spectrum of polycyclooctadiene formed using catalyst IC1. As shown in FIG. 4, the $^{13}C$ peak at 130 ppm is indicative of $^{13}C$ carbon atoms of carbon-carbon double bonds of the polymer that are in a cis (Z) configuration. The peak at 129 ppm is residual cyclooctadiene monomer. As shown in FIG. 4, there are no observable $^{13}C$ peaks indicative of $^{13}C$ carbon atoms of carbon-carbon double bonds of the polymer, that are in a trans (Z) configuration. Thus, the polycyclooctadiene product has 100% cis carbon-carbon double bonds. The peak at 27 ppm indicates the methylene carbons of the polycyclooctadiene. The peak at 28 ppm is residual cyclooctadiene monomer. The three peaks at 77 ppm are $CDCl_3$ solvent.

Overall, methods of the present disclosure provide polyolefins having 50% cis (Z) carbon-carbon double bonds or greater along the polymer backbone. Polymers of the present disclosure provide melting points of about −20° C. or less, glass transition temperatures of about −100° C. or less, and slow rates of crystallization, which make them ideal candidates for rubber replacements or additives to provide low temperature operability.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A method for forming a polyolefin having 60% or greater cis carbon-carbon double bonds and a melting point of from −40° C. to −20° C., the method comprising:
   contacting, at a temperature of about 20° C. to about 100° C., a $C_5$ cyclic olefin monomer selected from cyclopentene and cyclopentadiene, with a catalyst represented by Formula (I):

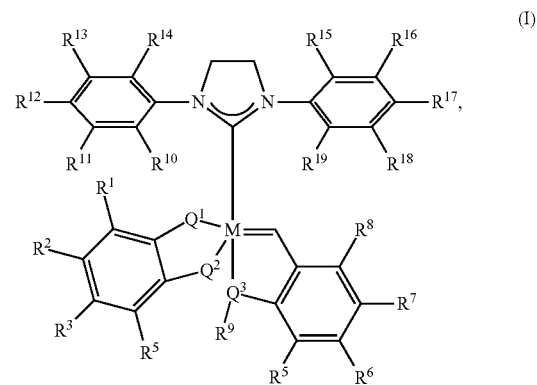

(I)

wherein:
M is a group 8 metal;
$Q^1$, $Q^2$, and $Q^3$ are independently oxygen or sulfur;
each of $R^1$ and $R^4$ is a halogen;
$R^9$ is $C_1$-$C_{40}$ hydrocarbyl or $C_1$-$C_{40}$ substituted hydrocarbyl; and
each of $R^2$, $R^3$, $R^5$, $R^6$, $R^7$, $R^8$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl.

2. The method of claim 1, further comprising contacting the catalyst with a second cyclic hydrocarbyl monomer different than the $C_5$ cyclic olefin monomer to form a polyolefin copolymer.

3. The method of claim 2, wherein the second cyclic hydrocarbyl monomer is one or more of cyclopropene, cyclobutene, cyclohexene, methylcyclohexene, cycloheptene, cyclooctadiene, cyclooctene, norbornadiene, norbornene, cyclobutadiene, cyclohexadiene, cycloheptadiene, cyclooctatetraene, 1,5-cyclooctadiene, 1,5-dimethyl-1,5-cyclooctadiene, dicyclopentadiene, and isomers thereof.

4. The method of claim 1, wherein M is ruthenium or osmium.

5. The method of claim 1, wherein M is ruthenium.

6. The method of claim 1, wherein $Q^1$ and $Q^2$ are sulfur and $Q^3$ is oxygen.

7. The method of claim 1, wherein each of $R^{10}$, $R^{12}$, $R^{14}$, $R^{15}$, $R^{17}$, and $R^{19}$ is independently $C_1$-$C_{40}$ hydrocarbyl.

8. The method of claim 1, wherein each of $R^{10}$, $R^{12}$, $R^{14}$, $R^{15}$, $R^{17}$, and $R^{19}$ is independently selected from methyl, ethyl, and propyl.

9. The method of claim 1, wherein each of $R^{11}$, $R^{13}$, $R^{16}$, and $R^{18}$ is hydrogen.

10. The method of claim 1, wherein each of $R^2$, $R^3$, $R^5$, $R^6$, $R^7$, and $R^8$ is independently hydrogen or $C_1$-$C_{40}$ hydrocarbyl.

11. The method of claim 1, wherein each of $R^2$, $R^3$, $R^5$, $R^6$, $R^7$, and $R^8$ is hydrogen.

12. The method of claim 1, wherein $R^9$ is selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl.

13. The method of claim 1, wherein $R^1$ and $R^4$ are chlorine.

14. The method of claim 1, wherein the catalyst is represented by Formula (II):

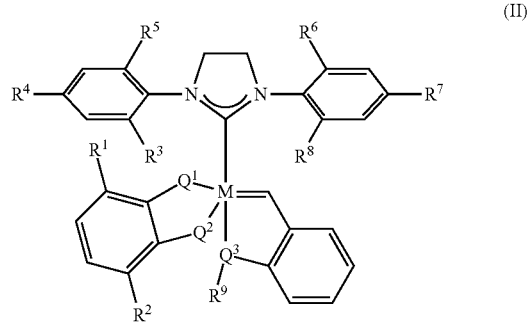

(II)

wherein:
M is a group 8 metal;
$Q^1$, $Q^2$, and $Q^3$ are independently oxygen or sulfur;
each of $R^1$ and $R^2$ is halogen;
$R^9$ is $C_1$-$C_{40}$ hydrocarbyl or $C_1$-$C_{40}$ substituted hydrocarbyl; and
each of $R^3$, $R^4$, $R^5$, $R^6$, $R^7$, and $R^8$ is independently hydrogen, halogen, $C_1$-$C_{40}$ hydrocarbyl, or $C_1$-$C_{40}$ substituted hydrocarbyl.

15. The method of claim 14, wherein M is ruthenium.

16. The method of claim 14, wherein $Q^1$ and $Q^2$ are sulfur and $Q^3$ is oxygen.

17. The method of claim 14, wherein each of $R^3$, $R^4$, $R^5$, $R^6$, $R^7$, and $R^8$ is independently $C_1$-$C_{40}$ hydrocarbyl.

18. The method of claim 14, wherein each of $R^3$, $R^4$, $R^5$, $R^6$, $R^7$, and $R^8$ is independently selected from methyl, ethyl, and propyl.

19. The method of claim 18, wherein $R^9$ is selected from methyl, ethyl, n-propyl, isopropyl, butyl, isobutyl, tert-butyl, sec-butyl, pentyl, isopentyl, sec-pentyl, hexyl, isohexyl, heptyl, isoheptyl, octyl, isooctyl, nonyl, isononyl, decyl, and isodecyl.

20. The method of claim 14, wherein $R^1$ and $R^4$ are chlorine.

21. The method of claim 1, wherein the catalyst is:

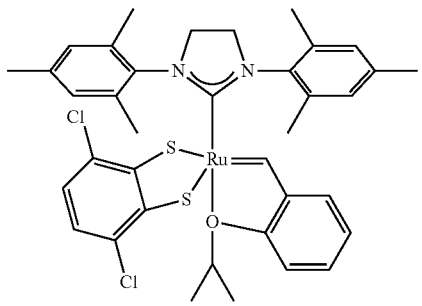

22. The method of claim 1, wherein the polyolefin has a melting point of from −40° C. to −25° C.

23. The method of claim 1, wherein the polyolefin has a glass transition temperature from −100° C. to −115° C.

24. The method of claim 1, wherein the polyolefin is a polycyclopentene having 90% or greater cis carbon-carbon double bonds.

25. A method for forming a olefin block copolymer having 50% or greater cis carbon-carbon double bonds, the method comprising:
contacting a first cyclic hydrocarbyl monomer with a catalyst represented by Formula (I) to form a polyolefin having 50% or greater cis carbon-carbon double bonds, wherein Formula (I) is:

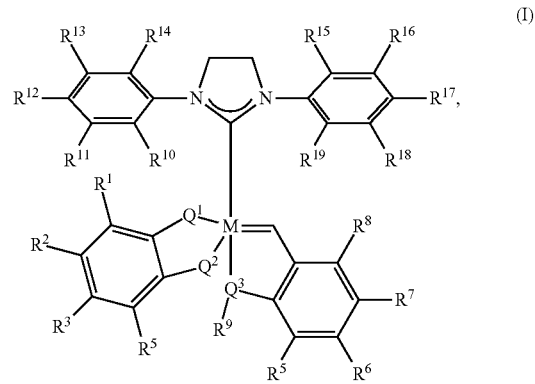

(I)

wherein:
M is a group 8 metal;
$Q^1$, $Q^2$, and $Q^3$ are independently oxygen or sulfur;
each of $R^1$ and $R^4$ is a first halogen;
$R^9$ is a first $C_1$-$C_{40}$ hydrocarbyl or, a first $C_1$-$C_{40}$ substituted hydrocarbyl; and
each of $R^2$, $R^3$, $R^5$, $R^6$, $R^7$, $R^8$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, a second halogen, a second $C_1$-$C_{40}$ hydrocarbyl, or a second $C_1$-$C_{40}$ substituted hydrocarbyl; and
contacting the polyolefin and the catalyst with a second monomer to form the block copolymer.

26. The process of claim 1 wherein the turnover number for the polymerization is from about 500 to about 50,000, where turnover number is defined to be [micromoles of metathesis product]/([micromoles of catalyst included in the reaction mixture].

27. The process of claim 1 wherein the process is a continuous process.

\* \* \* \* \*